(No Model.)
A. PROLHAC, FILS.
VALVE FOR ENGINES.
No. 549,585. Patented Nov. 12, 1895.
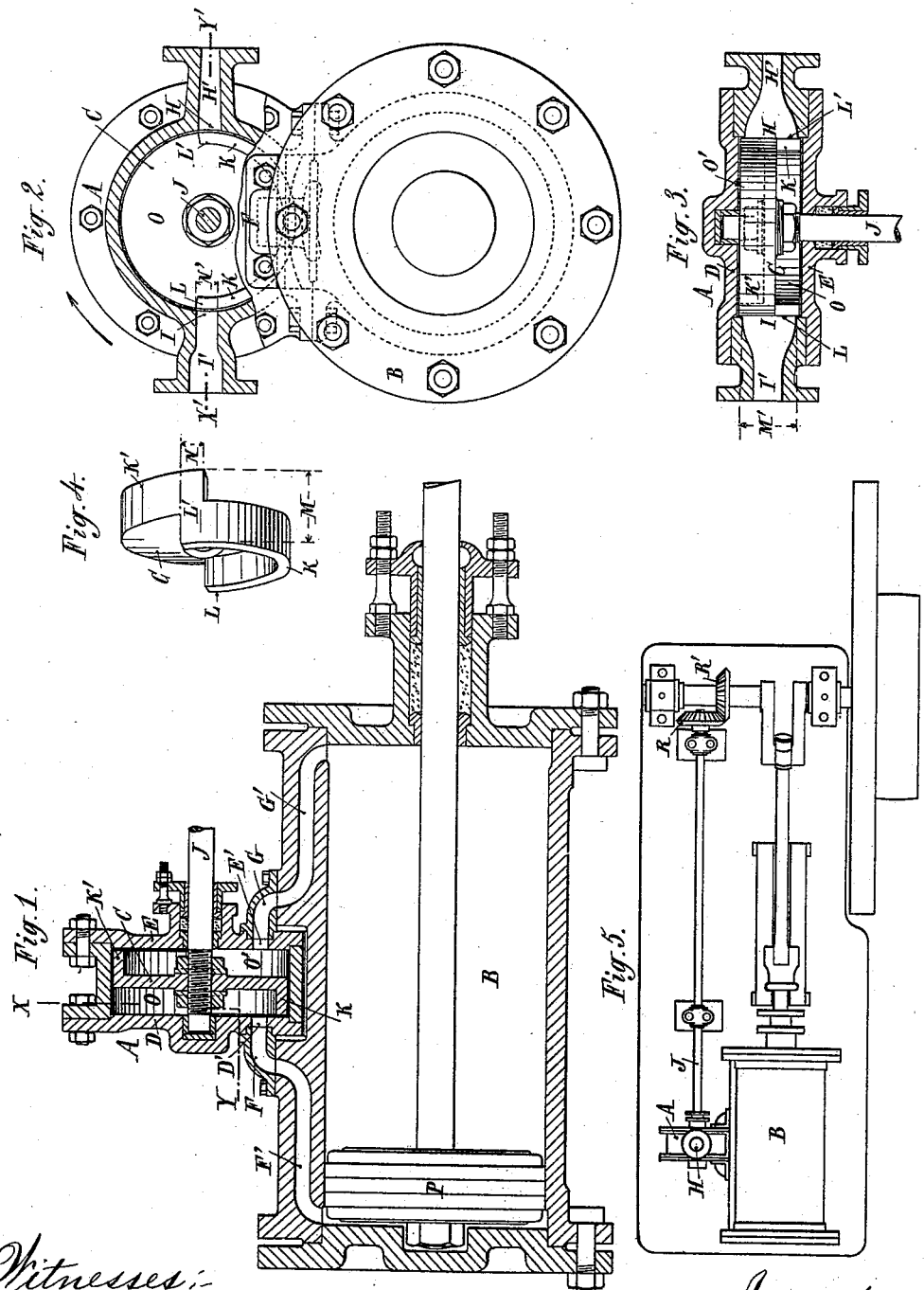
Witnesses:
H. K. Bonete[?]
Inventor:
Adrien Prolhac, fils
By Wm E. Coulter
Attorney

UNITED STATES PATENT OFFICE.

ADRIEN PROLHAC, FILS, OF ALLÈGRE, FRANCE.

VALVE FOR ENGINES.

SPECIFICATION forming part of Letters Patent No. 549,585, dated November 12, 1895.

Application filed June 17, 1895. Serial No. 553,046. (No model.) Patented in France January 15, 1895, No. 244,358.

*To all whom it may concern:*

Be it known that I, ADRIEN PROLHAC, Fils, a citizen of the Republic of France, residing at Allègre, France, have invented certain new and useful Improvements in or Relating to Valves for Fluid-Pressure Engines, (for which I have obtained Letters Patent in France, No. 244,358, dated January 15, 1895,) of which the following is a specification.

This invention relates to an improved steam-distribution valve and its appurtenances. The valve is intended to rotate continuously, and is illustrated, by way of example, in the accompanying drawings as applied to an engine working without expansion, although it is well suited to expansion-engines.

In the drawings, Figure 1 shows in longitudinal central section a cylinder with the valve applied thereto, the valve and valve-chest, as well as the cylinder, being in section. Fig. 2 is an end view of the apparatus shown in Fig. 1, the valve-chest being in vertical cross-section on the line X Y of the said Fig. 1. Fig. 3 is a plan view of the valve and valve-chest in section on the line X' Y' of Fig. 2. Fig. 4 is a detail view showing separately in perspective the principal element of my invention. Fig. 5 is a general diagram showing in plan a horizontal single-cylinder engine fitted with my improved valve and gear.

On examination of Figs. 1, 2, 3, and 4 it will be easily seen that my invention is essentially constituted by the combination of two principal organs or parts—a cylindrical valve-chamber A, mounted in the present instance on the engine-cylinder B, and a circular disk C, rotatable inside the cylindrical chamber A, said disk, in conjunction with the flanges K K', presently described, constituting and performing the function of a distributing-valve.

The vertical end walls D E of the chamber A are provided with openings D' E', joined by short pipes F G to orifices or ports in the steam-cylinder face, which are the openings of the usual steam-passages F' G' of the said cylinder. The circular wall or shell of the chamber A is perforated at two diametrically-opposite points with two rectangular ports or openings H I, by which a communication is afforded between the interior of the chamber A and two pipes H' I'. One of these ports—say, for instance, H—will act as steam-admission port, while the other one I will act as steam-exhaust port. Consequently the pipe H' is put in connection with the steam-admission pipe, while the pipe I' is put in connection with the exhaust-pipe. As previously stated, within the chamber A thus constructed the circular disk C fits and rotates. This disk C is secured on one end of a shaft J, which traverses its center, and is carried by suitable bearings in the walls D E of the chamber A. Its other end, outside of the chamber A, is connected with mechanism by which its continuous rotation and that of the disk C is produced.

The disk C, arranged in the hollow interior of the chamber A, is provided with two interrupted or segmental flanges K K', one on each side of the disk C. These are arranged symmetrically, but diametrically opposite to one another, their equal and similar circumferential extent exceeding the semi-circumference of the disk by the diameter of one of the ports H I and their ends respectively extending past each other by the same distance, so that at those two points the two flanges have in common a continuous cylindrical surface L or L'. These latter surfaces are intended to work in conjunction with the two ports H I for steam admission to and exhaust from the chamber A. These will, respectively, be shut or open—shut for more and open for less than a semi-revolution of the disk by the continuous rotation of the said flanges K K', in the manner hereinafter described. The length M, Fig. 4, of the cylindrical segments at L L' may be equal to or less than that of the interior space of the chamber A, (between the lateral walls D and E thereof;) but in all cases it must be larger than that M', Fig. 3, of the ports H I. As regards their width N, Fig. 4, it must, as stated, be equal in principle to that N', Fig. 2, of the said ports H I. Thus constituted and in combination with the distribution-chamber A the distributing-disk C forms within the said chamber two compartments O O', entirely distinct and having no communication with each other, assuming, of course, that the cylindrical contact-surfaces of the disk C and valve-chamber A are perfectly fitted, so as to allow the constant rotation of the former within the latter under slight friction without permitting the passage of steam between the said contact-surfaces.

The constitution of my improved system of steam distribution having thus been set forth, its working is easily understood.

When the piston P is at one end of the steam-cylinder B, as shown in Fig. 1—i. e., at the end of its back stroke—the position of the disk C in the valve-chamber A will be that shown in Figs. 1, 2, and 3 in principle. In this position the surfaces L L', forming the longer cylindrical segments of the disk C, exactly close the ports II I of steam admission and exhaust over their entire area. The continued rotation of the disk C in the direction of the arrow, Fig. 2, causes the part of the surface L' of the flange K in the empty compartment O to partly uncover and open the steam-admission port II, while the other part of the said port II in the empty compartment O' will remain closed by the flange K' on that side during the semi-revolution thereof, whereas simultaneously the steam-exhaust port I in the same compartment O' is partially uncovered or opened by the flange K', while its other part, facing into the compartment O, remains closed by the flange K during the semi-revolution of that flange in front of it. Under these conditions the steam admitted by the pipe II', passing through the open and uncovered section of the port II, fills the vacant space O of the valve-box, passes through the opening D' and short pipe F, and thence through the passage F' in the cylinder-wall, so as to act upon the rear surface of the piston P and drive it through its forward stroke. Thereby the steam, which in the previous stroke acted on the forward piston-surface, will be driven out by the passage G' and, passing by the short pipe G, enter and fill the empty space O', escaping through the open or uncovered half of the exhaust-passage I, and finally out into the open air through the escape-pipe I'.

The above-described arrangements are suitable in principle for use with motors working without expansion.

In practice, and more especially for single-cylinder motors, the keying on of the distributer C in relation to the two extreme positions of the piston P must be effected in such manner that closure of the admission and exhaust ports shall not be absolutely completed at the moment of arrival of the piston in one or the other extreme—that is, to insure the actual function of steam admission and exhaust, and consequently the working of the motor, whatever may be the position of the piston at admission and cut-off.

For the application of my system of a continuous rotary distributing-valve to motors working with expansion the realization of the determined degree of expansion is effected by a variation either in the length of development of the flanges K K' of the disk C or in the dimensions of the surfaces of the coincident segments L L' thereof, or, finally, in the dimensions and positions of the steam admission and exhaust ports II I, such variations in development, dimensions, or positions being naturally determined and combined, the ones in relation to the others, with a view to the obtention of the required duration for the several operations of admission, expansion, exhaust, compression, and lead.

The rotary motion of the distributing-valve C may be brought about in any suitable manner. In the engine illustrated by the diagram, Fig. 5, it is effected with the aid of a pair of miter-wheels R R', carried the one by the valve-shaft J, the other by the main crank-shaft of the engine.

The position of my improved valve-chest and gear may, of course, vary in relation to the steam-cylinder; but in all cases it is well that it should be located as close as possible thereto, so as to minimize, as far as possible and for reasons well understood, the spaces in the ports and passages.

I claim—

The combination with the cylinder and the annular or cylindrical valve chest or chamber, mounted thereon, the heads or end walls of said chest having ports D' E' communicating with the interior of the cylinder at opposite ends, and the circular wall of the chest having diametrically opposite ports, II I, of the rotary disk C, arranged within the chest, said disk having segmental flanges K K' on opposite sides, the length of said flanges being such as to cause their ends to overlap and form at such points continuous cylindrical surfaces as described, the extent of overlap being equivalent to the circumferential extent or diameter of the ports II I, and the length of said continuous cylindrical surfaces being greater than the transverse extent or width of said ports II I, as described, all arranged and adapted for cooperation as and for the purpose set forth.

In testimony whereof I have hereunto subscribed my hand in the presence of the two subscribing witnesses.

A. PROLHAC, FILS.

Witnesses:
EDOUARD POL,
ALBERT LEVASSEUR.